United States Patent [19]
Spykerman

[11] Patent Number: 5,517,731
[45] Date of Patent: May 21, 1996

[54] DECOUPLING CLIP

[75] Inventor: David J. Spykerman, Wyoming, Mich.

[73] Assignee: Prince Corporation, Holland, Mich.

[21] Appl. No.: 116,120

[22] Filed: Sep. 2, 1993

[51] Int. Cl.⁶ ...................................................... A44B 21/00
[52] U.S. Cl. .............................. 24/295; 24/341; 52/582.1; 52/713; 403/407.1
[58] Field of Search ................. 24/341, 682, 336, 24/295, 294, 563, 355, 616, 555, 545, 531, 335, 338, 573.1, 293, 696, 625; 403/407.1; 52/713, 714, 715, 528.1, 582.1

[56] References Cited

U.S. PATENT DOCUMENTS

| | | |
|---|---|---|
| 1,146,713 | 7/1915 | Kauffman . |
| 1,873,648 | 8/1932 | Keinath .................. 24/341 X |
| 2,009,991 | 8/1935 | Anderson . |
| 2,379,179 | 6/1945 | Petersen ................. 24/336 X |
| 2,414,986 | 1/1947 | Tinnerman . |
| 2,492,566 | 12/1949 | Geyer ..................... 24/297 X |
| 2,567,554 | 9/1951 | Davey . |
| 2,893,067 | 7/1959 | Meek . |
| 2,934,180 | 4/1960 | Hammitt et al. . |
| 3,144,733 | 8/1964 | Balinski . |
| 3,205,546 | 9/1965 | Nelson . |
| 3,208,119 | 9/1965 | Seckerson ............... 24/295 X |
| 4,020,611 | 5/1977 | Amos . |
| 4,223,966 | 9/1980 | Winters .................. 24/341 X |
| 4,444,321 | 4/1984 | Carlstrom ............... 24/625 X |
| 4,617,772 | 10/1986 | Hassell . |
| 4,630,338 | 12/1986 | Osterland et al. . |
| 4,703,603 | 11/1987 | Hills . |
| 4,860,409 | 8/1989 | Bering et al. ................ 24/289 |
| 4,867,500 | 9/1989 | Oosterbaan et al. . |
| 5,186,517 | 2/1993 | Gilmore et al. . |
| 5,297,889 | 3/1994 | Crouse et al. ............ 24/336 X |

FOREIGN PATENT DOCUMENTS

| | | | |
|---|---|---|---|
| 515217 | 4/1957 | Italy ....................... 24/294 |
| 809652 | 2/1959 | United Kingdom ..... 24/294 |

*Primary Examiner*—James R. Brittain
*Attorney, Agent, or Firm*—Price, Heneveld, Cooper, DeWitt & Litton

[57] ABSTRACT

A decoupling clip for joining parts for normal use in a secure fashion and yet be easily separated as necessary for servicing includes a first clip having at least one spring clamp which extends into lockable, permanent engagement with a first part and a second clip with at least one spring clamp which lockably and permanently engages a second part. One of the first or second clips includes an aperture for removably receiving a decoupling locking element on the other of said clips whereby each of the clips are permanently mounted to a respective part and removably mounted to each other through the releasable interconnection of the locking member and recess.

16 Claims, 1 Drawing Sheet

DECOUPLING CLIP

BACKGROUND OF THE INVENTION

The present invention pertains to a clip-type fastener for use in vehicles and one which is employed for mounting two vehicle parts together for normal use and yet, allows the parts to be separated if necessary.

There is a wide variety of fastening devices for attaching vehicle parts to one another and particularly plastic parts. In the vehicle environment for example, armrest and console bodies may include multiple panels or sections which are either welded, heat staked, or otherwise attached by fasteners. Fastening methods have included providing flanges with apertures formed therethrough in one of the parts and tabs which interlock into the apertures in the other part for holding the panels or parts together. Some of these fastening methods are permanent i.e. once the parts are attached to one another, they cannot be separated. Other methods such as screw-type fasteners allow disassembly for servicing when necessary. There has been widespread use of clips in the automotive environment which snap-fit within apertures in a vehicle panel for attachment of a panel to the underlying support structure. Also, some clip-type fasteners can receive conventional screw fasteners. U.S. Pat. No. 3,205,546 discloses a mounting clip which fastens within a panel and includes a flange to which a second fastener can be removably attached. U.S. Pat. No. 2,934,180 discloses a structural element for joining adjacent panels of a partitioning structure. Although these clips provide some interconnection of panel shaped elements or removability of a clip-type device, neither provide the permanence available with the structure of the present invention and yet, allow separation of the parts for servicing.

SUMMARY OF THE INVENTION

The present invention comprises a decoupling clip in which parts can be joined for normal use in a secure fashion and yet, easily separated as necessary for servicing. In the preferred embodiment of the invention a decoupling clip is provided which includes a first clip having at least one spring clamp which extends into lockable, permanent engagement with a first part and a second clip with at least one spring clamp which lockably and permanently engages a second part. One of the first or second clips includes recess means for removably receiving a decoupling locking element on the other of said clips whereby each of the clips are permanently mounted to a respective part and removably mounted to each other through the releasable interconnection of the locking member and recess.

In a preferred embodiment of the present invention, each of the spring clips include a pair of spaced spring clamps in a generally U-shaped structure including a central section and the recess is formed through the central section of one of the clips and the locking means is formed in the central section of the opposite clip. In a preferred embodiment also, the locking member comprises a pair of spring arms having edges which engage edges of the recess on the opposite clip and which allows the decoupling of the respective clips which remain on their associated parts.

DETAILED DESCRIPTION OF THE PREFERRED EMBODIMENT

Figure 1:
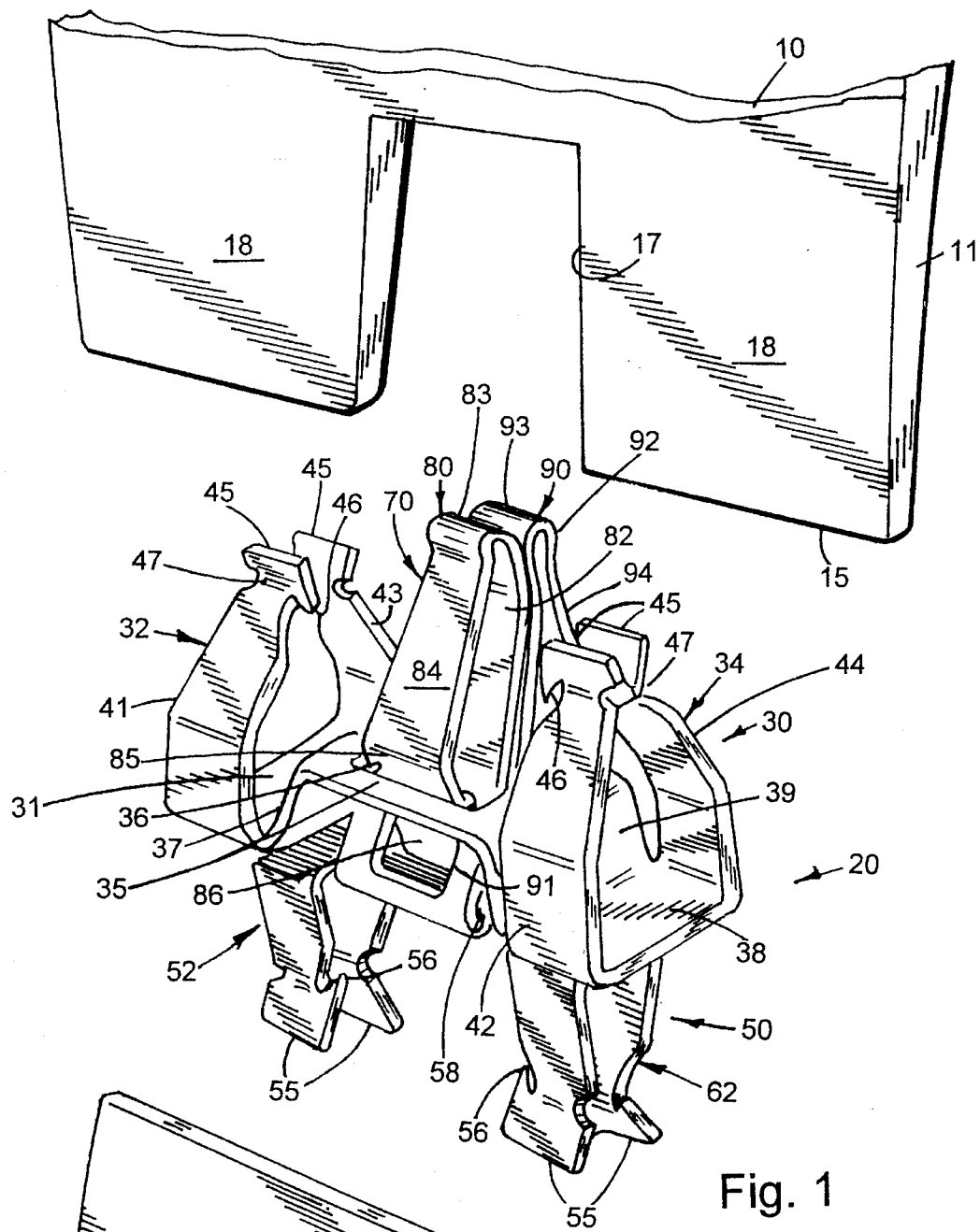
FIG. 1 is an enlarged exploded perspective view of a decoupling clip of the present invention and its relationship to a pair of vehicle parts to be joined.

Referring to the sole FIG. 1, there is shown a decoupling clip 20 for joining a pair of vehicle parts 10 and 12 which are to be coupled together on a generally permanent basis, however, where it is desired to be able to separate the parts if necessary for servicing. Parts 10 and 12 may be, for example, the upper and lower halves of a vehicle console to which a variety of vehicle accessories have been mounted such as electronic equipment, a cellular telephone, or the like. First part 10 may be the upper half or cover of a console and part 12 the lower body of the console. Regardless of the vehicle part, typically it will be made of a polymeric material such as polyvinylchloride, polycarbonate, or the like and each of parts 10 and 12 may include tapered tabs 11 and 13 respectively with ends 15 and 16 which are to be joined in closely abutting relationship. The tabs 11 and 13 may be integrated into an edge of tile parts as shown, or an edge of the parts may be tapered to provide the mounting structure for tile decoupling clip 20 of the present invention. In the preferred embodiment of tile invention shown, part 10 includes an upwardly extending clearance notch 17 for receiving a portion of the decoupling clip as described below, while tab 13 comprises a continuous element.

The decoupling clip 20 of the present invention is shown in FIG. 1 positioned in alignment for installation on the respective parts 10 and 12 and includes a first clip member 30 and a second clip 50 each made of a suitable spring steel material, heat and rust treated for the automotive environment. For purposes of clarity, clip 50 is shaded differently than clip 30 to distinguish the two (2) clips. Clip 30 includes a pair of spaced spring clamps 32 and 34 at opposite ends thereof joined by a raised central body 35 having a generally square recess 36 formed therethrough. Central body 35 is integrally joined to the base 31 of clamp 32 at one end by an upwardly inclined wall 37 and to base 38 of clamp 34 by a similarly inclined wall 39.

Each of tile clamps 32 and 34 have upwardly extending and inwardly converging legs 41 and 43 on clamp 32, and 42 and 44 on clamp 34 respectively. The ends of each of the legs 41–44 terminate in substantially identical outwardly diverging tips 45 each of which have at least one downwardly and inwardly extending pointed finger 46 which is adapted to slip fit over the tapered walls 18 of member 10 and subsequently dig-into tile polymeric walls to lockably attach the clip 30 to member 10 when it is pushed over the downwardly projecting tabs spanning opposite sides of notch 17 during installation. For such purpose, the spacing between the outwardly diverging tips 45 is slightly greater than the narrowed end 15 of member 10 while the spacing between the neck 47 at the ends of tile clamps 32 and 34 is smaller than that of end 15 or tile at least the thicker section of part 10 to which the clip 30 ultimately becomes attached during installation. As a result, the spring steel legs 41–4 of clamps 32 and 34 spread outwardly to compressibly engage the member 10 with tips 46 lockably holding the clip 30 in place once inserted onto body 10.

Clip 50 likewise includes a pair of spaced clamping members 52 and 62 joined by a central body 58 which integrally includes a centrally aligned upwardly extending decoupling locking member 70. Each of the clamps 52 and 62 are substantially identical to clamps 32 and 34 and include downwardly and inwardly converging legs having outwardly diverging tips 55 each with an inwardly projecting finger 56 for compressibly engaging and digging-into the side walls 19 of member 12 in the same manner as clip 30 engages member 10 to permanently attach clip 50 to member 13.

Clip 50 also includes the decoupling locking member 70 which is integral with the clip and comprises a pair of outwardly and upwardly extending formed legs 80 and 90, each of which including a central leg 82 and 92 respectively extending upwardly in closely spaced relationship to one another from the body 58 of clip 50. Legs 80 and 90 have rounded tips 83 and 93 respectively and extend downwardly and outwardly in leg sections 84 and 94 respectively. Legs 84 and 94 include a crowned horizontally extending edge 85 (the crown on leg 94 not shown) which fits over and engages tile edges of aperture 36 for holding locking member 70 and therefore couples clip 50 to clip 30. The legs 84 and 94 terminate in inwardly and downwardly extending end segments 86 with a corresponding, inwardly turned segment of leg 94 not shown. These leg segments extend through apertures 91 formed near the junction of the opposite leg 80 or 90 with body 58 and are in a compressed position when installed as shown to provide an outward holding force for locking member 70 within aperture 36.

Decoupling member 70 therefore, can be inserted through recess or aperture 36 in body 35 as seen in FIG. 1 by deformably compressing legs 80 and 90 such that the free outer legs can deflect inwardly until the crown 85 (and the corresponding crown on leg 94) extends slightly above recess 36 as seen for locking clips 30 and 50 together with the floors 31 and 38 of clamps 32 and 34 in substantially coplaner or closely parallel relationship with body 58 of clip 50. The two clips 30 and 50 are thus held securely together while the respective clamps associated with each of the clips are substantially, permanently attached to parts 10 and 12 for assembling the parts together. The width of clip 50 can be less than the spacing between clamp 32 and 34 of clip 30 so that the clips nest together if body 35 of clip 30 is elongated.

If it becomes necessary to service the vehicle accessory comprising parts 10 and 12, the parts can be separated by proving either a sufficient pulling force to release decoupling member 70 from recess 36, or by compressing legs 84 and 94 inwardly such that the crowns, including crown 85, clear the recess 36 and the two clips can be separated. Typically, a pulling force of from about 4–6 pounds for each clip is necessary for decoupling tile clips. As can be appreciated, parts 10 and 12 may be joined by several such decoupling clips which relatively permanently hold the parts together. The clearance notch 17 provides clearance for the decoupling locking member 70 and tips 93 and 83 do not engage the upper wall of notch 17 which also provides clearance for compressing tile locking member for releasing the clips from one another if access to part 10 is available in the particular construction in which the decoupling clip is employed.

It will become apparent to those skilled in tile art that various modifications to the preferred embodiment of the present invention can be made without departing from the spirit or scope thereof as defined by the appended claims.

The embodiments of the invention in which an exclusive property or privilege is claimed are defined as follows:

1. A decoupling clip for coupling first and second vehicle parts together comprising:

a first clip having a body and including at least one spring clamp having a pair of inwardly projecting legs having ends for compressibly engaging a first vehicle part for holding said first clip to the first part, said body having an aperture formed therein; and a second clip having a body and including at least one spring clamp having a pair of inwardly projecting legs in a direction opposite said legs of said first clip when joined to said first clip for compressibly engaging a second vehicle part, said second clip further including a releasable locking member having a pair of deformable spring legs extending in a direction opposite said legs of said spring clamp of said second clip for releasably engaging said aperture in said first clip such that said first and second clips can be selectively decoupled from one another by compressing said deformable spring legs of said locking member, wherein said spring legs extend beyond said ends of said pair of inwardly projecting legs of said first clip.

2. The decoupling clip as defined in claim 1 wherein each of said first and second clips include at least two clamps spaced at opposite ends of their respective bodies.

3. The decoupling clip as defined in claim 2 wherein each of said legs of said clamps include outwardly divergent tips.

4. The decoupling clip as defined in claim 3 wherein said outwardly divergent tips include inwardly projecting fingers for inter-engaging a part to which said legs of said clamps are compressibly mounted.

5. A decoupling clip for coupling first and second parts together comprising:

a first clip having a body and including at least one spring clamp having a pair of inwardly projecting legs having ends for compressibly engaging a first part for holding said first clip to the first part, said body having an aperture formed therein; and a second clip having a body and including at least one spring clamp having a pair of inwardly projecting legs in a direction opposite said legs of said first clip when joined to said first clip for compressibly engaging a second part, said second clip further including a releasable locking member extending in a direction opposite said legs of said spring clamp of said second clip for releasably engaging said aperture in said first clip such that said first and second clips can be selectively decoupled from one another, wherein each of said first and second clips include at least two clamps spaced at opposite ends of their respective bodies and wherein each of said legs of said clamps include outwardly divergent tips which include inwardly projecting fingers for inter-engaging a part to which said legs are compressibly mounted; and wherein said locking member comprises a pair of resilient legs which include ends which extend outwardly beyond ends of said legs of said first clip and crowned sections spaced to position the bodies of said clips in closely adjacent relationship when said locking member is engaged within said aperture of said first clip.

6. The decoupling clip as defined in claim 5 wherein each of said clips is made of a spring steel material.

7. The decoupling clip as defined in claim 6 wherein each of said clips is integrally formed.

8. A decoupling clip for coupling first and second vehicle parts together comprising:

a first spring steel clip including a pair of spaced spring clamps for compressibly engaging a first part for holding said first clip to the first part, said first clip having an aperture formed therein between said clamps; and a second spring steel clip including a pair of spaced spring clamps for compressibly engaging a second part, said second clip further including a releasable locking member extending in a direction for releasably engaging said aperture in said first clip such that said first and second clips can be selectively decoupled from one another, wherein each of said clamps include a pair of spaced inwardly projecting legs and wherein each of said legs of said clamps include outwardly divergent tips, said outwardly divergent tips include inwardly projecting fingers for inter-engaging a part to which said legs are compressibly mounted; and wherein said locking member comprises a pair of spring legs which extend outwardly and include means for positioning said clips in closely adjacent relationship when said locking member engages said aperture of said first clip, said spring legs of said locking member extend in a first direction and are formed to bend away from said first direction and terminate in inwardly directed ends to define a crown which engages said first clip when said locking member is inserted into said aperture of said first clip.

9. The decoupling clip as defined in claim 8 wherein each of said spring legs include an aperture near the junction with their associated clip such that said inwardly directed end of said spring leg extends into said aperture of said spring leg.

10. The decoupling clip as defined in claim 9 wherein said clips are integrally formed.

11. First and second vehicle parts and a clip for coupling said first and second vehicle parts together comprising:

a first vehicle part;

a second vehicle part to be coupled to said first vehicle part;

a first clip including a body and a pair of spaced spring clamps with ends for compressibly engaging said first part for holding said first clip to the first part, said first clip having an aperture formed through said body between said clamps; and a second clip including a body and a pair of spaced spring clamps for compressibly engaging said second part, said second clip further including a pair of resilient arms extending in a direction opposite said spring clamps of said second clip, said resilient arms releasably engaging said aperture in said first clip and beyond said ends of said spring clamps of said first clip to engage said second vehicle part such that said first and second vehicle parts are held together and can be selectively decoupled from one another by compressing said resilient arms.

12. The decoupling clip as defined in claim 11 wherein each of said clamps include a pair of spaced inwardly projecting legs.

13. The decoupling clip as defined in claim 12 wherein each of said legs of said clamps include outwardly divergent tips.

14. The decoupling clip as defined in claim 13 wherein said outwardly divergent tips include inwardly projecting fingers for interengaging a part to which said legs of said clamps are compressibly mounted.

15. The decoupling clip as defined in claim 14 wherein said resilient arms of said locking member extend outwardly and include means for positioning said clips in closely adjacent relationship when said locking member engages said aperture of said first clip.

16. The decoupling clip as defined in claim 15 wherein each of said clips is made of a spring steel material.

* * * * *

UNITED STATES PATENT AND TRADEMARK OFFICE
CERTIFICATE OF CORRECTION

PATENT NO. : 5,517,731                    Page 1 of 2
DATED      : May 21, 1996
INVENTOR(S): David J. Spykerman It is certified that error appears in the above-indentified patent and that said Letters Patent is hereby corrected as shown below:

Column 1, line 29;
   "clement" should be --element--.

Column 2, line 16;
   "tile" should be --the--.

Column 2, line 18;
   "tile" should be --the--.

Column 2, line 20,
   "tile" should be --the--.

Column 2, line 39;
   "tile" should be --the--.

Column 2, line 46;
   "tile" should be --the--.

Column 2, line 52;
   "tile" should be --the--.

Column 2, line 53;
   "tile" should be --the--.

Column 2, line 55;
   "41-4" should be --41-44--.

UNITED STATES PATENT AND TRADEMARK OFFICE
CERTIFICATE OF CORRECTION

PATENT NO. : 5,517,731
DATED : May 21, 1996
INVENTOR(S) : David J. Spykerman

It is certified that error appears in the above-indentified patent and that said Letters Patent is hereby corrected as shown below:

Column 3, line 13;
   "tile" should be --the--.

Column 3, line 42;
   "tile" should be --the--.

Column 3, line 48;
   "tile" should be --the--.

Column 3, line 52;
   "tile" should be --the--.

Signed and Sealed this

Thirteenth Day of August, 1996

Attest:

BRUCE LEHMAN

Attesting Officer     Commissioner of Patents and Trademarks